United States Patent [19]

Matney

[11] E Patent Number: Re. 33,191

[45] Reissued Date of Patent: Apr. 3, 1990

[54] BLISTER PACK PANEL FOR FACE POWDER COMPACT DISPLAY

[76] Inventor: Arthur Matney, 360 Furman St., Brooklyn, N.Y. 11201

[21] Appl. No.: 901,430

[22] Filed: Aug. 28, 1986

Related U.S. Patent Documents

Reissue of:

[64] Patent No.: 4,469,226
Issued: Sep. 4, 1984
Appl. No.: 525,644
Filed: Aug. 23, 1983

[51] Int. Cl.[4] ..... B65D 73/00

[52] U.S. Cl. ..... 206/470; 206/467; 206/461

[58] Field of Search ..... 206/461, 462, 467, 470, 206/471

[56] References Cited

U.S. PATENT DOCUMENTS

| | | | |
|---|---|---|---|
| D. 262,150 | 12/1981 | Sussman . | |
| D. 263,003 | 2/1982 | Tong . | |
| 2,884,127 | 4/1959 | Neary . | |
| 3,127,010 | 3/1964 | Capezzuto . | |
| 3,129,817 | 4/1964 | Rohdin | 206/462 |
| 3,301,392 | 1/1967 | Regan, Jr. . | |
| 3,365,308 | 1/1968 | Janicke . | |
| 3,519,128 | 7/1970 | Swanberg . | |
| 3,752,303 | 8/1973 | Foster . | |
| 3,809,226 | 5/1974 | Ferrari . | |
| 3,942,640 | 3/1976 | Hellstrom . | |
| 3,972,417 | 8/1976 | Iten et al. . | |
| 4,058,212 | 11/1977 | Wyslotsky . | |
| 4,165,805 | 8/1979 | Fethke et al. . | |
| 4,179,029 | 12/1979 | Fethke et al. . | |
| 4,270,659 | 6/1981 | Kuchenbecker . | |
| 4,319,684 | 3/1982 | Backman et al. . | |
| 4,356,919 | 11/1982 | Matney . | |
| 4,378,068 | 3/1983 | Bell . | |
| 4,456,124 | 6/1984 | Kay et al. . | |

*Primary Examiner*—Joseph M. Moy
*Attorney, Agent, or Firm*—Hoffmann & Baron

[57] ABSTRACT

Blister pack panel for face powder compact display in which the purchaser checks the color of the face powder to determine the suitability of that color for the personal preferance of the purchaser by opening the compact, the blister pack being of a special novel construction to fit over the latching projection and around the hinge opposite the latching projection so that the blister retains the compact securely in tamper proof relation to the solid supporting panel used to display the case. Heretofore a pressure sensitive label which was dyed to match the color of the powder in the compact was affixed to the panel next to the printed description of the shade of the powder. These dyed pressure sensitive lables become soiled during handling by the purchasers and change color. Also the dyed labels may change color because of exposure to strong lighting as for example in a high intensity spot light which may be used for a cosmetic display case. This problem facing the purchaser of finding that color on the card label does not match the color when the purchase has been made and the contents inspected is overcome by the present invention because the transparent blister of special ovoid shape and construction which is modified specifically for the clasp and hinge parts of the compact provide a much more economical display of the face powder compact than displays of the prior art which rely upon pressure sensitive labels or cut out panel formations.

6 Claims, 2 Drawing Sheets

Fig. 1
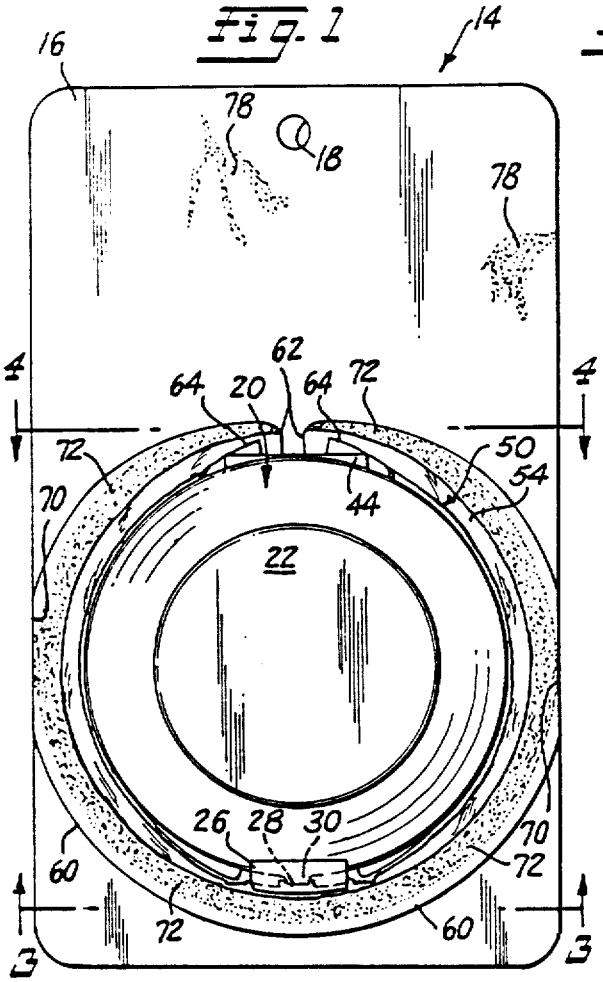
Fig. 2
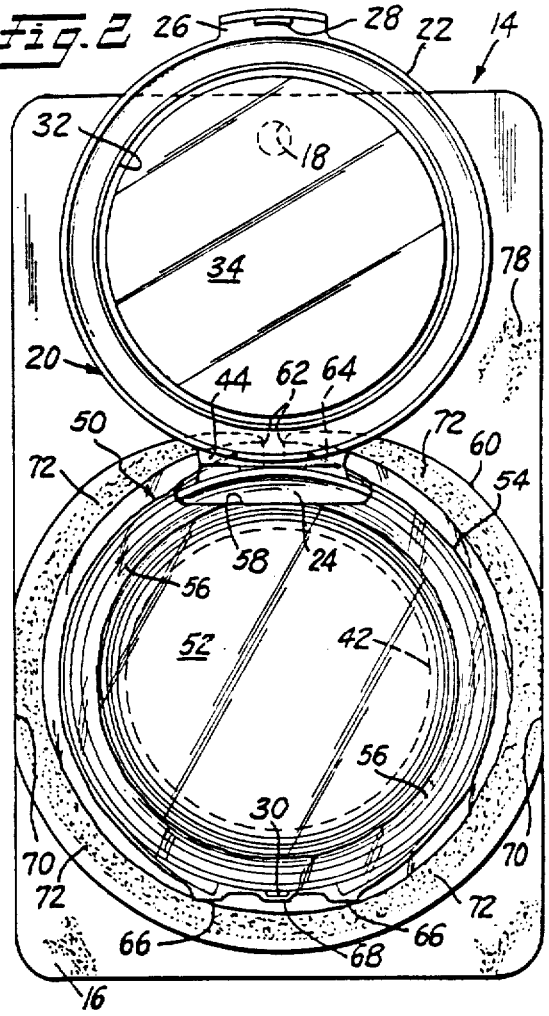
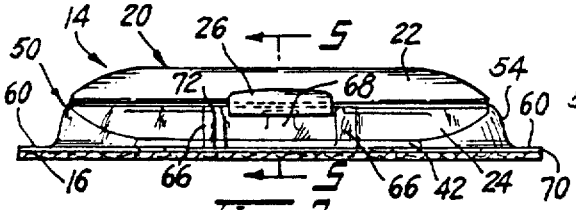
Fig. 3
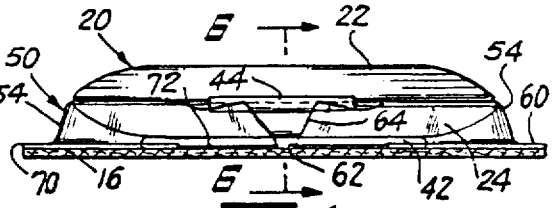
Fig. 4
Fig. 5
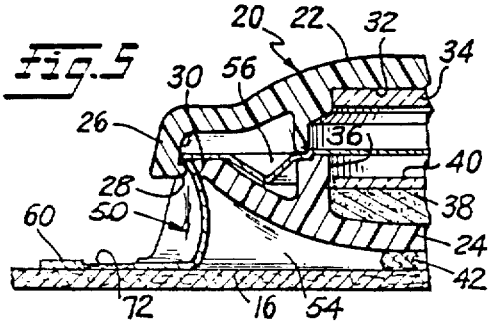
Fig. 6
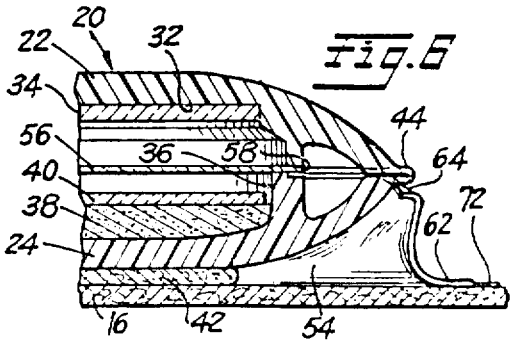

BLISTER PACK PANEL FOR FACE POWDER COMPACT DISPLAY

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to special packages for article housing attached to a panel container consisting of a plate backing member to which an enclosing cover is affixed, the enclosing cover being made of a relatively heavy gauge thermoplastic material such as vinyl resin and being contoured to retain the article in tamper proof relation to the solid panel.

2. Description of the Prior Art

Blister pack display packages have been described for the inclusion of tamper proof features such as a folded hinge insert between hinges of a transparent razor blade display case described in Snape, U.S. Pat. No. 3,025,958.

Blister pack cosmetic displays have been suggested for the purpose of permitting the purchaser to check the shade of the cosmetic as in the lipstick display package of Warner, et al, U.S. Pat. No. 3,762,545. This lipstick package uses a special container for the lipstick which permits the lipstick to protrude when the package is inverted.

Quick opening blister pack packages for cosmetics have been suggested to facilitate opening the cosmetic package and examples of quick opening packages are shown in FIGS. 9 through 11 of Hellstrom, U.S. Pat. No. 3,942,640.

Finally, there are lipstick blister packs in which the package itself is retained with the goods which are placed into the lady's purse as in Acker, U.S. Pat. No. 4,326,546.

In none of the cosmetic packages except one which is sold by Noxell Division under the Trademark COVER GIRL, is there provided a face powder compact display blister package which is associated with a backing panel which utilizes shrink wrapping of thin gauge thermoplastic wrapping material for retaining the compact within the panel in a cut out portion of the panel against a back panel.

It is known that artists packages such as in Heberline, et al, U.S. Pat. No. 571,521, are provided in which cavities are filled with powders in different colors and these powders are wrapped with their transparent plastic wrappings. The customer may check these colors easily and in use may remove the wrapping to select the color which is viewed directly. However, there is no suggestion in the prior art that a heavy gauge transparent blister pre-form be modified for a face powder compact display so that it will cover the face powder contents only, retaining the compact in cradled relation to the solid panel and permitting opening and closing of the compact for purchasers who may wish to check the shade. The COVER GIRL display is formed of a special cut out 2-ply folded panel and the process for enrobing the compact is known as Shrink Pack, a very flexible and thin sheet material being used for wrapping the compact within the enclosure provided by the cut out portions of the panel. There are no cut out portions in the "Shrink Pack" of COVER GIRL.

The present invention distinguishes over the COVER GIRL compact in utilizing an entirely different and novel pre-form of the blister for attachment to a solid panel.

SUMMARY OF THE INVENTION

A face powder compact display unit comprises a solid panel, a pre-formed blister consisting of relatively heavy gauge thermoplastic material and a face powder compact held within the blister on the panel by heat sealing the bottom edges of the pre-formed blister blank to the panel. The invention is based upon the novel features of the pre-formed blister which adapt it to be inserted between the mirror of the compact in the top and over the face powder contents in the bottom of the compact so that the blister which secured the compact to the panel passes through the compact between the top and bottom and yet permits the compact to be opened and closed by its latch and clasp.

The pre-formed thermoplastic blister before sealing the face powder compact to the panel is generally ovoid in shape and is cut in critical portions of the blister to completely cover the face powder chamber or well near the hinge, to completely cover the indented sides adjacent the lapping projection of the locking clasp and to center the compact within the blister pre-form prior to heat sealing so that there is a secure and tight support for the compact provided by the heat sealed blister.

It is a feature of the blister material in distinction to shrink wrap materials which have been used heretofore that the thermoplastic sheet material which is pre-formed be relatively thick and rigid in contrast to shrink wrap material which is thin, pliable and flexible. For a 5-gauge vinyl resin blister material which is conventionally used for blister pack the thickness of the pre-formed blister varies from 3 to 4 mils. The thickness may be heavier, e.g. from 5–7 mils. Shrink wrap material varies from ½ mil to 1 mil in thickness. The rigid characteristic of the sheet material is likewise different, e.g. the blister pack is stiff and can not be stretched or deformed while the shrink pack is thin and stretches easily and thereby readily deformed. The special blister pack pre-formed material of the invention has its maximum thickness at the latching portion where repeated locking and unlocking operations of the compact can occur. A very substantial thinning of the blister pack can occur during its deformation while it is being cut and pre-formed without in any manner detracting from its intended purpose in contouring support for the contents being displayed and in secure engagement of the article being displayed. As can be seen from the drawings herein, the pre-form of the invention has all of the advantages as the conventional pre-form which is adapted to enclose the entire powder compact over the top rather than through the compact itself.

BRIEF DESCRIPTION OF THE DRAWINGS

FIG. 1 is a plan view of the blister pack panel, with the face powder compact shown in its closed position;

FIG. 2 is a plan view but with the top of the face powder compact shown in open position, so that the powder contents may be readily inspected;

FIG. 3 is a vertical sectional view, taken on the line 3—3 of FIG. 1 showing the latch at the front of the compact;

FIG. 4 is a vertical sectional view, taken on the line 4—4 of FIG. 1 showing the rear hinged portion of the compact;

FIG. 5 is an enlarged fragmentary vertical sectional view, taken on the line 5—5 of FIG. 3, showing in detail the latch and keeper of the compact;

FIG. 6 is an enlarged fragmentary vertical sectional view, taken on the line 6—6 of FIG. 4, showing the hinge arrangement at the rear of the compact;

DESCRIPTION OF THE PREFERRED EMBODIMENT

Figure 7:
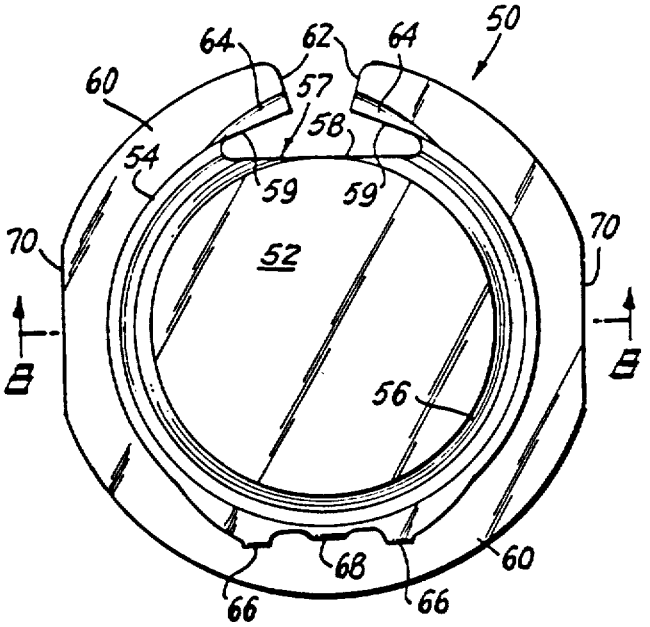
FIG. 7 is a top plan view of the blister for securing the bottom half of the compact to the panel.

As shown in FIGS. 1 through 6, the assembled compact display unit 14 comprises panel 16, hang hole 18, face powder compact 20, pre-formed blister 50 which passes through the compact between the top 22 and bottom 24 over the face powder 38 which is contained in the compact within the powder chamber 36.

The compact is of the conventional type, preferably made of plastic material and is provided with mirror 34 in the top 22, mirror 34 being retained within the mirror well or chamber 32. The bottom of the compact 24 is latched to the top by latch 26 and is opened from the latch by the upward swinging movement of the top from hinge 44. The compact is provided with the usual powder puff 42.

Figure 8:
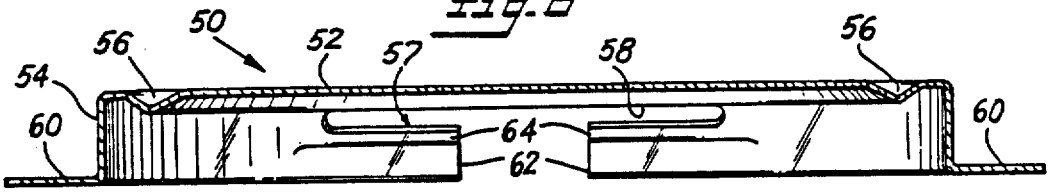
FIG. 8 is an enlarged transverse vertical sectional view, through the blister, taken on the line 8—8 of FIG. 7.

The details of the blister are best shown in FIGS. 7 and 8 but these details can be more readily understood by reference to FIGS. 1 and 2 with respect to the compact, FIG. 1 showing the compact in closed position and FIG. 2 the compact in opened position.

The pre-formed blister 50 which is generally ovoid in construction, has a flange 60 which projects at the base, the width of the flange being substantially uniform throughout except for the flat cuts at the right and left sides as shown in FIG. 7, these being termed flats to denote the straight edge adapting the heat seal to the straight sides of the panel 16. At the very top and at the very bottom of the blister 50 in the 12 o'clock position and in the 6 o'clock position there are provided the two critical cut-out portions within the dome of the blister 52, the dome or top wall being cut out along a straight line tangent to the chamber of the powder, powder well 36 of the bottom of the compact. The two flange portions at the base 62 which surround the lower portion of the blister are designated as the terminators of the flange 60 at the hinge end and these terminators are given reference numeral 62. These terminators extend toward each other to be separated by a distance just equal to the extent or width of the hinge 44. In the particular preferred embodiment which is used commercially, this width of the hinge is slightly smaller than the transverse dimension of the slasp at the 6 o'clock position in FIGS. 1 and 2 and the blister portions for the clasp that correspond to the clasp and latch elements 26, 28 and 30 are 66 and 68 in the blister overlying the clasp.

In the embodiment of compact display unit 14 shown in FIGS. 1 through 6, the plate-like backing member to which the enclosing blister 50 is attached by heat sealing is preferably formed of cardboard which contains a sizing coating and constitutes panel 16. The purpose of the sizing coating is to prevent the penetration of printing ink. The display unit is printed and hung by the hang hole 18. High quality printing is not achieved unless the cardboard is treated and this treatment is conventional.

The novel features of the generally oval shaped or ovoid pre-formed blister consisting of a relatively heavy gauge and rigid synthetic resin sheet material subjected to the pre-forming and cutting process for manufacturing of the blister is shown in FIGS. 7 and 8. The blister 50 which has been pre-formed and cut comprises a dome or top 52, pre-formed and shaped side walls 54 and a flange 60.

The flange 60 is provided with diametrically opposed flat areas 70 which are aligned with the edges of the display card 16 during the heat sealing procedure in order to center the compact 20 and blister 50 thereon. Within the top or dome 52 there is an indentation surrounding the entire dome constituting a depending stiffening groove which fits into a recess just within the edge of the bottom 24 of the compact 20. This depending stiffening groove 56 stiffens the dome or top wall 52 in much the same fashion as corrugations stiffen a cardboard panel. A critical feature of the special blister construction 50 of the present invention is the triangular cut out portion 57 having a base 58 and sides 59 which with relation to the sides 54 presents the appearance of a triangular cut out section. The length of the straight line portion of the base portion 58 is the length of an arc which lies parallel to the hinge and is tangent to the edge of the powder chamber 36 of the compact. Since the powder 38 which is held within the powder chamber 36 has its own cover and since the dome portion or top of the top wall 52 which extends rearwardly from the cut out 58 covers the entire powder chamber 36 and its contents of powder 38, there is no possibility for tampering with the package by the purchaser to take place during which a cut can be made in the powder chamber cover to thereby dissipate the contents. The flange 60 terminates at a termination end 62 immediately behind the hinge. This permits the flange termination sections to be heat sealed to the panel 16 or to alternate panels 76, 86 or 96 shown in FIGS. 9, 10 and 11, respectively, to assure that the hinge is flanked on each side by the termination 62 of the flange. In this manner a unique characteristic of the mounting of the blister about the hinge is provided based upon the termination portion 62 of each side of the flange coming into registry at each side of the hinge 44 of the compact 20.

In the formation of the blister 50 the side walls 54 at the triangular cut-out 57 are turned inwardly to accommodate the hinge 44 to form the flange 64 as best seen in FIG. 6.

As shown in FIGS. 7 and 8, the opposite side of the cut-out straight edge 58 and its cooperating terminating flange ends 62 provides a locking dome assembly comprising the intermediate projection at the side wall 54 to which there has been applied reference numeral 68. This intermediate projection lies intermediate to projections 66, whose relationship to 68 is similar to those of the terminating ends 62. By the term "similar" it is intended to point out that the right side projection of the termination 62 which terminates from the flange lies generally opposite to element 66 which is the right side projection away from the clasp cover. In similar fashion the left flange termination end 62 lies generally opposite the left side projection from the side wall 54. In short, the flange termination portions 62 at the left and right respectively extend to the edge of the straight line cut 58 at the top of the blister and the corner at the left of straight edge 58 is in line with the left intermediate projection 66 while the right corner 58 is in line with the right projection 66. In effect, the two projections 66 left and right register the bottom clasp of the compact at the latch 26 to permit the latching element of the compact 28 to fit over the intermediate projection 68 with the left and right projections 66 holding the compact 20 in fixed position so that the latch and latching elements 26 and 28, respectively, are located at the 6 o'clock position. With this particular location it will be seen from FIG. 8 that the depending stiffening groove 56 anchors the top wall 52 of the blister 50 in a flat and smooth position between the hinge of the compact 44 and the clasp. The purchaser simply opens the latching element 28 by manipulating manually element 28 in the upward direction. The latch releases from the keeper 30 which holds the compact to the bottom and the cover constituting the top 22 of the compact swings open in the view shown in FIG. 2. A large mirror 34 extending substantially the entire inner dimensions of the cover comprising the top 22 is mounted within the mirror chamber 32. The purchaser, with the mirror open, can in one glance check the complexion in the image seen in the mirror for its shade against the shade of the cosmetic powder and determine at a glance whether the shade is a match for that which the purchase is wearing or represents an improvement or represents a shade which is not as suitable and therefore would be discarded. Without disturbing the compact display combination, the cover is closed by swinging the top 22 to the closed position shown in FIG. 1.

Figure 9:
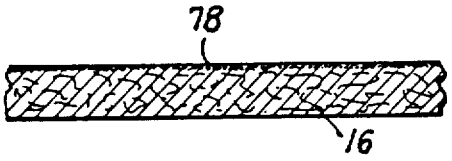
FIGS. 9 and 11 are greatly enlarged views illustrating various coatings applied to the surface of the panel in order to prepare it for the assembly of the blister and for printing the indicia thereon.
Figure 10:
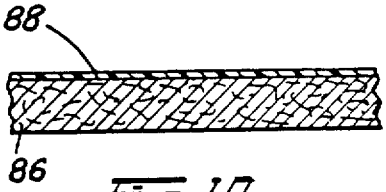
Figure 11:
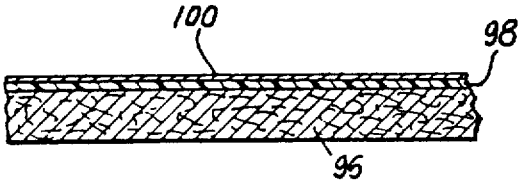

In FIGS. 9, 10 and 11 there are shown panels to which the blister is heat sealed in much the same fashion as the heat seal 72 is accomplished with the pre-formed blister in FIGS. 1 through 6. In FIG. 9 the panel is identified by reference numeral 16 and consists of a relatively rigid cardboard or similar cellulosic stock material which is coated with a coating adapted for printing, coating 78. Printing on uncoated cardboard can be accomplished but the distinctness of the indicia will not be as good as where a base coat is applied to the cardboard. Coated cardboard uses conventional synthetic resin coating material.

In the embodiment shown in FIG. 11, the panel 96 is provided with a coating of metallic aluminum 100 which overlies a primary coating of plastic 98. Aluminum coating which can be applied in a very thin layer of the order of 1/10 of a mil permits the heat to be dissipated very quickly during heat sealing and permits good adhesion. In the embodiment of FIG. 10 the panel 86 is provided with a plastic coating which has a very substantial heat conductivity and is adapted to the heat seal. Such coatings are well known in the art. An example of a good heat sealing coating is made of plastic material to supply the desired properties of plastic coating 88 in FIG. 10 is furnished by coating with cellulose esters such as cellulose acetate and cellulose propionate. A wide selection of operating temperatures may be made by proper selection of the synthetic plastic material which is used for the coating. Vinyl resins which are co-polymers of vinyl chloride and vinyl acetate may be used to coat the panel 86 in providing plastic coating 88 in FIG. 10.

An important advantage of the special blister pack assembly in the present novel display panel unit 14 which is shown in FIGS. 1 and 2 lies in the fact that the powder puff 42 can not be easily removed from the package without destroying the blister. Destruction of the blister 50, since it is formed of a rigid heavy gauge plastic material, requires very great effort and would be readily noticeable. Accordingly, a comparison with shrink pack panel display units which have been described herein for the prior art compact, the present blister pack construction is more resistant to tampering and pilferage, more economical to construct, and sturdier in its appearance and in its display function. The powder puff can easily be retrieved from the prior art shrink pack but cannot be retrieved from the special package display unit of the present invention.

Although the above description has been set forth with relation to a round compact 20 having curved sides, where a top and bottom are hinged and are closed, it is within the scope of the invention to utilize the oval shaped blister for a generally rectangular compact having its hinge opposite its clasp with the same curved relationship at the sides so that the top and bottom taper to a fine edge in much the same manner as a watch tapers at the edge.

What is claimed is:

1. A compact display unit permitting a compact to be opened to check the color face powder therein by the purchaser comprising:

a plate-like backing member *forming one layer* to which an enclosing cover *forming a second layer* is adapted to be affixed;

a pre-cut and pre-formed blister serving as the enclosing cover for the bottom of the compact enclosed therein and heat sealed in flat blister to panel relationship to said panel *to form a two layer unit;* a compact comprising a top, a bottom, a hinge, and opposite said hinge a clasp consisting of a latch and a latching element, said compact being provided with a powder chamber in the bottom holding powder, a mirror chamber in the top holding a mirror, and face powder in said powder chamber;

said pre-cut and pre-formed blister having a top wall which fits over the powder chamber of said compact between the mirror and the powder, an indented portion forming a depending stiffening groove which fits flat against the bottom of the compact, a [straight] cut-out portion *formed in the blister* adjacent the hinge of the compact [which is tangent to the edge of the powder chamber] and [directly opposite said cut-out portion folded over portions constituting an intermediate projection for the latching parts of the clasp and projecting portions to the right and left of said intermediate projection which project from the side walls of said blister] *centering means* to register the clasp and hinge with the blister in place;

said blister further provided with a flange at its bottom which surrounds the blister except at the hinge portion of the compact where the flange is provided with flange termination portions to register against the sides of the hinge when the flange is heat sealed to the panel to securely attach the blister around the bottom of the compact.

2. A compact display unit as claimed in claim 1 wherein said panel consists of a plate-like backing member formed of cardboard.

3. A compact display unit as claimed in claim 1 wherein said plate-like backing member constitutes cardboard to which is applied a sizing coating serving to limit the penetration of printing ink.

4. A compact display unit as claimed in claim 1 wherein said plate-like backing member is cardboard which is coated with a synthetic resin coating.

5. A compact display unit as claimed in claim 1 wherein said plate-like backing member is cardboard which is coated with a synthetic resin coating over said cardboard and further coated with metallic aluminum to enhance the thermoconduction when said blister is heat sealed to said cardboard backing member.

6. A pre-cut and pre-formed blister formed from a relatively stiff thermoplastic material and having a thickness of from about 3 mils to about 8 mils, comprising:

a top wall constituting the dome of said blister which is fitted by pre-forming to surround a compact between the mirror of the compact in the top and the powder in the bottom;

a side wall extending about the top edge of said dome from said top wall;

a flat flange portion extending from the bottom of said side wall outwardly which surrounds said top wall;

said top wall provided with an indented portion forming the depending stiffening groove which fits flat against the bottom of the compact above the powder chamber of the compact to protect the powder therein from being disturbed;

said flange portion being cut at the upper part of the blister to permit the edge of the cut portion to register against the side of the hinge of the compact, with the compact being positioned so that its hinge will lie at the top and its clasp will lie at the bottom opposite the hinge;

said top portion being further provided with a straight cut-out portion adjacent to the hinge which is tangent to the edge of the powder chamber and directly opposite the clasp of the compact, and said blister being further provided with projecting portions folded over the clasp directly at the latch so as to encase the latching projection, said projecting portion being flanked at the left and at the right of the clasp with additional projections which serve to register the clasp of the compact at the bottom with a hinge of the compact at the top to provide a tight fit of the compact within the blister.

* * * * *